(12) United States Patent
Oohashi

(10) Patent No.: US 6,943,466 B2
(45) Date of Patent: Sep. 13, 2005

(54) STATOR FOR A DYNAMOELECTRIC MACHINE

(75) Inventor: Atsushi Oohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/755,478

(22) Filed: Jan. 13, 2004

(65) Prior Publication Data

US 2004/0145257 A1 Jul. 29, 2004

(30) Foreign Application Priority Data

Jan. 27, 2003 (JP) ........................................ 2003-017234

(51) Int. Cl.⁷ ............................. H02K 3/32; H02K 3/34
(52) U.S. Cl. ........................ 310/45; 310/180; 310/184
(58) Field of Search ................................. 310/179–180, 310/184, 195–196, 198, 203, 207–208, 45, 215

(56) References Cited

U.S. PATENT DOCUMENTS

| | | | | |
|---|---|---|---|---|
| 3,151,260 A | * | 9/1964 | Maccracken, Jr. | 310/43 |
| 5,097,167 A | * | 3/1992 | Kanayama et al. | 310/201 |
| 5,140,292 A | * | 8/1992 | Aronow | 336/205 |
| 6,147,432 A | * | 11/2000 | Kusase et al. | 310/260 |
| 6,181,045 B1 | * | 1/2001 | Umeda et al. | 310/201 |
| 6,191,508 B1 | * | 2/2001 | Aoki et al. | 310/45 |
| 6,333,573 B1 | * | 12/2001 | Nakamura | 310/45 |
| 6,396,184 B1 | * | 5/2002 | Asao | 310/180 |
| 6,429,552 B2 | * | 8/2002 | Asao et al. | 310/64 |
| 6,462,453 B1 | * | 10/2002 | Asao et al. | 310/179 |
| 6,486,586 B2 | * | 11/2002 | Higashino et al. | 310/263 |
| 6,492,757 B2 | * | 12/2002 | Nakamura et al. | 310/180 |

FOREIGN PATENT DOCUMENTS

JP 2000-278901 A 10/2000

* cited by examiner

*Primary Examiner*—Burton Mullins
(74) *Attorney, Agent, or Firm*—Sughrue Mion, PLLC

(57) ABSTRACT

A stator winding is prepared by inserting U-shaped conductor segments into pairs of slots from a first end surface end of a stator core and welding together end portions of the conductor segments projecting outward at a second end surface end of the stator core. Joint portions between the end portions of the conductor segments are arranged into two rows in an annular shape in a circumferential direction at the second end surface end of the stator core. A first electrically-insulating layer is formed by applying an epoxy resin so as to cover each of the joint portions and to bridge radially-adjacent pairs of the joint portions. A second electrically-insulating layer is formed by applying a silicone resin so as to cover the first electrically-insulating layer and to extend to an electrically-insulating coating on the conductor segments.

11 Claims, 9 Drawing Sheets

STATOR FOR A DYNAMOELECTRIC MACHINE

BACKGROUND OF THE INVENTION

1. Field of the Invention

The present invention relates to an electrical insulation construction for a stator for a dynamoelectric machine for ensuring electrical insulation by covering a joint portion surface of conductor wires constituting a stator winding with an electrically-insulating resin.

2. Description of the Related Art

In a conventional stator for an automotive alternator, a stator winding is used in which wave windings are formed by inserting U-shaped conductor segments into pairs of slots from a first axial end of a stator core and welding together end portions of the conductor segments projecting outward at a second axial end of the stator core. In addition, a single electrically-insulating layer is formed by applying a silicone resin so as to cover the welded portions of the conductor segments. Since the modulus of elasticity of the silicone resin is small, it is claimed that the occurrence of insulation failure resulting from exposure of the welded portions to moisture is suppressed and electrical insulation of the stator is improved because cracking and peeling of the electrically-insulating layer resulting from differences in coefficients of expansion between the welded portions and the electrically-insulating layer are reduced. (See Patent Literature 1, for example.)

Patent Literature 1: apanese Patent Laid-Open No. 2000-278901 (Gazette, paragraphs 0005 to 0009.)

In the conventional stator for an automotive alternator, because a single electrically-insulating layer formed so as to cover the welded portions of the stator winding is constituted by a silicone resin having a small modulus of elasticity, one problem has been that the overall rigidity of the coil ends cannot be increased, therefore increasing electromagnetic noise resulting from vibration of the stator brought about by magnetic attraction arising between the stator and the rotor.

SUMMARY OF THE INVENTION

The present invention aims to solve the above problems and an object of the present invention is to provide a stator for a dynamoelectric machine capable of ensuring electrical insulation while reducing electromagnetic noise by constructing an electrically-insulating layer formed so as to cover stator winding joint portions in two layers including a first electrically-insulating layer covering the joint portions and a second electrically-insulating layer covering the first electrically-insulating layer, and using a material in the first electrically-insulating layer having a larger modulus of elasticity than the material in the second electrically-insulating layer to increase the rigidity of the coil ends by means of the first electrically-insulating layer and, in addition, to prevent exposure of the joint portions due to cracking and peeling occurring in the first electrically-insulating layer by means of the second electrically-insulating layer.

With the above object in view, the stator for a dynamoelectric machine of the present invention includes an annular stator core in which a large number of slots having grooves lying in an axial direction are formed in a circumferential direction so as to open onto an inner circumferential side and a stator winding installed in the stator core. The stator winding is provided with a plurality of winding sub-portions constructed by installing base strands in the slots at intervals of a predetermined number of slots so as to alternately occupy an inner layer and an outer layer in a slot depth direction and welding end portions of the base strands. The base strands are formed by coating an electrically-insulating coating onto a metal wire material. Joint portions between the end portions of the base strands are arranged into at least one row in a circumferential direction. A first electrically-insulating layer is formed so as to cover each of the joint portions and to bridge a pair of the joint portions adjacent in at least one direction selected from a group including a radial direction and a circumferential direction. A second electrically-insulating layer is formed so as to cover the first electrically-insulating layer and to extend to the electrically-insulating coating of the end portions of the base strands. The first electrically-insulating layer has a modulus of elasticity that is larger than a modulus of elasticity of the second electrically-insulating layer.

Thus, the rigidity of the coil ends is increased by means of the first electrically-insulating layer, and exposure of the joint portions due to cracking and peeling occurring in the first electrically-insulating layer is prevented by means of the second electrically-insulating layer, thereby providing a stator for a dynamoelectric machine capable of ensuring electrical insulation while reducing electromagnetic noise.

DETAILED DESCRIPTION OF THE PREFERRED EMBODIMENTS

Preferred embodiments of the present invention will now be explained with reference to the drawings.
Embodiment 1

Figure 1:
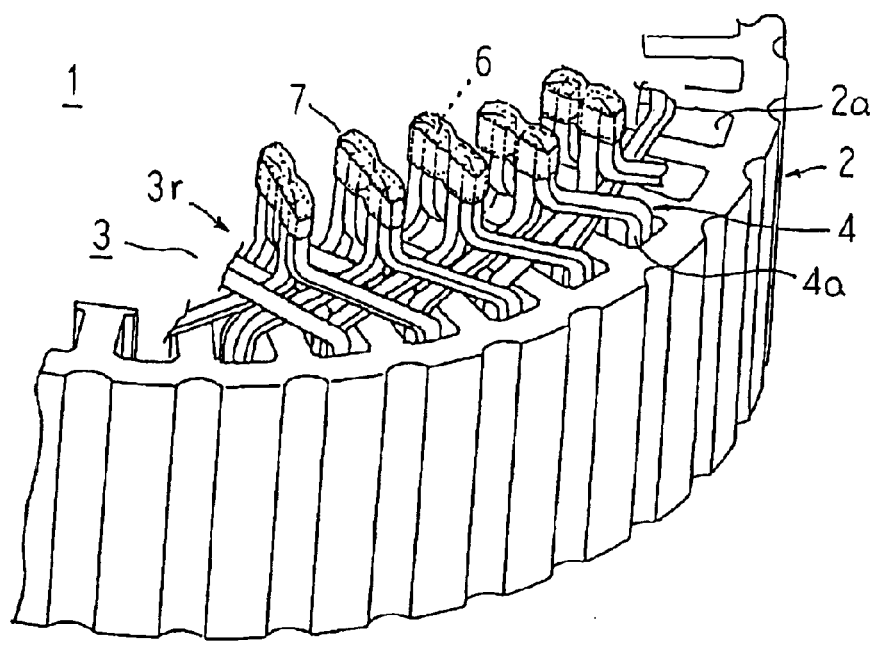
FIG. 1 is a partial perspective showing a stator for a dynamoelectric machine according to Embodiment 1 of the present invention.
Figure 2:
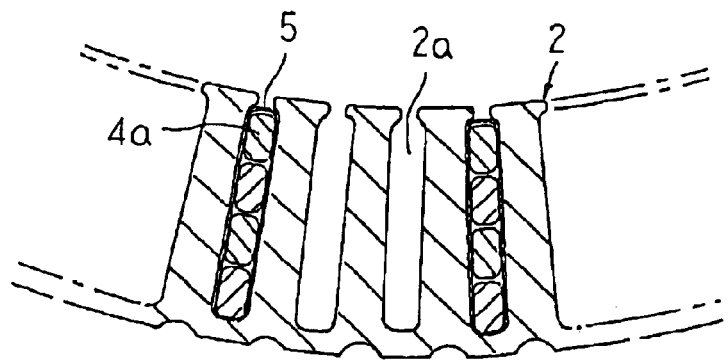
FIG. 2 is a partial cross section showing the stator for a dynamoelectric machine according to Embodiment 1 of the present invention.
Figure 3:
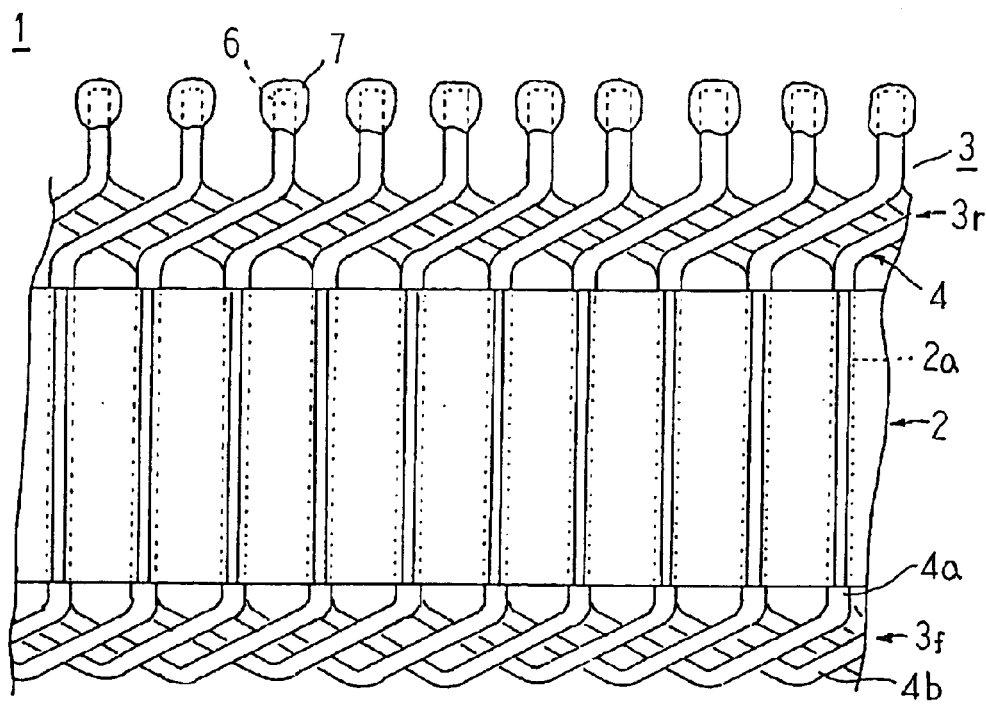
FIG. 3 is a partial plan showing the stator for a dynamoelectric machine according to Embodiment 1 of the present invention viewed from radially inside.
Figure 4:
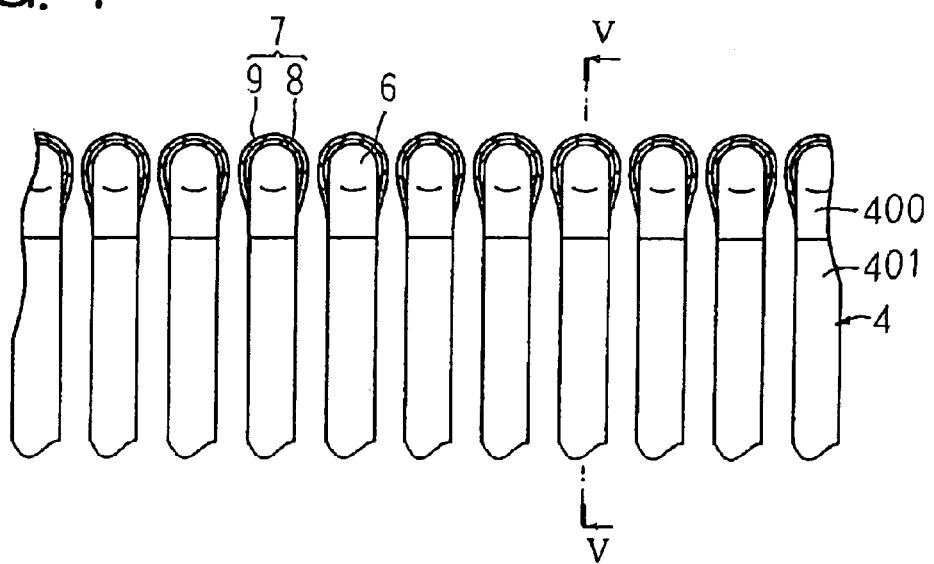
FIG. 4 is a cross section explaining an electrical insulation construction of joint portions of a stator winding in the stator for a dynamoelectric machine according to Embodiment 1 of the present invention.
Figure 5:
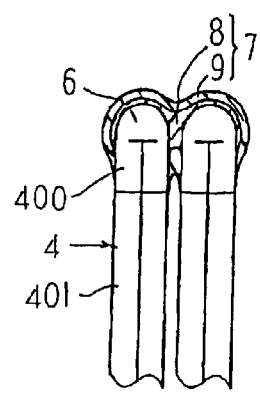
FIG. 5 is a cross section taken along line V—V in FIG. 4 viewed from the direction of the arrows.
Figure 6:
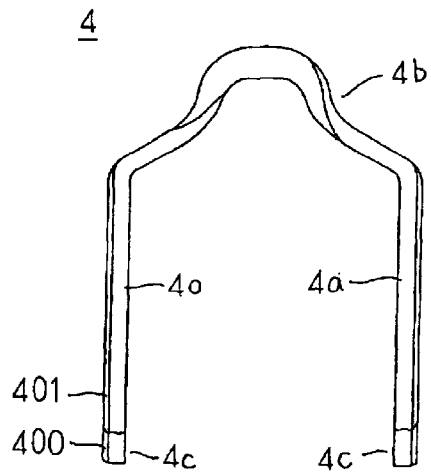
FIG. 6 is a perspective showing a conductor segment used in the stator winding in the stator for a dynamoelectric machine according to Embodiment 1 of the present invention.

FIG. 1 is a partial perspective showing a stator for a dynamoelectric machine according to Embodiment 1 of the present invention, FIG. 2 is a partial cross section showing the stator for a dynamoelectric machine according to Embodiment 1 of the present invention, FIG. 3 is a partial plan showing the stator for a dynamoelectric machine according to Embodiment 1 of the present invention viewed from radially inside, FIG. 4 is a cross section explaining an electrical insulation construction of joint portions of a stator winding in the stator for a dynamoelectric machine according to Embodiment 1 of the present invention, FIG. 5 is a cross section taken along line V—V in FIG. 4 viewed from the direction of the arrows, and FIG. 6 is a perspective showing a conductor segment used in the stator winding in the stator for a dynamoelectric machine according to Embodiment 1 of the present invention. Moreover, to facilitate explanation, FIG. 2 shows conductor segments inserted into only one pair of slots three slots apart.

In the figures, a stator 1 is constituted by: an annular stator core 2; and a stator winding 3 installed in the stator core 2.

In the stator core 2, slots 2a having grooves lying in an axial direction are arranged at a predetermined pitch in a circumferential direction so as to open onto an inner circumferential side.

A construction of the stator winding 3 will now be explained.

A conductor segment 4 functioning as a base strand, as shown in FIG. 6, is constructed by shaping a short length of metal wire material 400 (a copper wire material, for example) covered with an electrically-insulating coating 401 (an enamel coating, for example) into a U shape in which a pair of straight portions 4a are linked by a return portion 4b. The electrically-insulating coating 401 is removed from end portions 4c of the conductor segment 4 to expose the metal wire material 400.

Pairs of (first and second) conductor segments 4 are inserted from a first end surface end (a first axial end) of the stator core 2 into pairs of (first and second) slots 2a three slots apart. Thus, in each of the slots 2a, as shown in FIG. 2, four straight portions 4a are housed in close contact with each other so as to line up in a single column in a radial direction. Electrical insulation between adjacent straight portions 4a is ensured by the electrically-insulating coating 401 covering the straight portions 4a, and electrical insulation between the straight portions 4a and inner wall surfaces of the slots 2a is ensured by insulators 5. Moreover, to facilitate explanation, housing positions of the straight portions 4a inside each of the slots 2a are designated Address 1, Address 2, Address 3, and Address 4 radially outward from a radially-inner side.

In each of the pairs of slots 2a, the pair of straight portions 4a of the first conductor segment 4 are inserted into Address 1 inside the first slot 2a and Address 2 inside the second slot 2a, and the pair of straight portions 4a of the second conductor segment 4 are inserted into Address 3 inside the first slot 2a and Address 4 inside the second slot 2a. Projecting portions of each of the conductor segments 4 projecting outward from a second end surface end (a second axial end) of the stator core 2 are bent away from each other. Next, the end portion 4c of the conductor segment 4 projecting outward from the second end surface end of the stator core 2 from Address 1 of each of the slots 2a is joined to the end portion 4c of the conductor segment 4 projecting outward from the second end surface end of the stator core 2 from Address 2 of a slot 2a three slots away in the direction of bending of the projecting portions of the conductor segments 4 to construct wave windings. Similarly, the end portion 4c of the conductor segment 4 projecting outward from the second end surface end of the stator core 2 from Address 3 of each of the slots 2a is joined to the end portion 4c of the conductor segment 4 projecting outward from the second end surface end of the stator core 2 from Address 4 of a slot 2a three slots away in the direction of bending of the projecting portions of the conductor segments 4 to construct wave windings. Here, the end portions 4c are stacked in a radial direction, and welded to each other by tungsten inert-gas (TIG) welding, etc. Finally, electrically-insulating layers 7 are formed by application on joint portions 6 between the end portions 4c of the conductor segments 4 to obtain the stator winding 3.

In the stator winding 3 constructed in this manner, at the first end surface end of the stator core 2, the return portions 4b linking the straight portions 4a inserted into Address 1 and Address 2 of the pairs of slots 2a and the return portions 4b linking the straight portions 4a inserted into Address 3 and Address 4 of the pairs of slots 2a are arranged into an annular shape at a pitch of one slot in a circumferential direction so as to be separated in a radial direction to constitute a first coil end group 3f. Moreover, the return portions 4b constitute coil ends in the first coil end group 3f.

At the second end surface end of the stator core 2, linking portions (coil ends) linking the straight portions 4a inserted into Address 1 and Address 2 of the pairs of slots 2a and linking portions (coil ends) linking the straight portions 4a inserted into Address 3 and Address 4 of the pairs of slots 2a are arranged into an annular shape at a pitch of one slot in a circumferential direction so as to be separated in a radial direction to constitute a second coil end group 3r. The joint portions 6 constituting each of the linking portions are arranged at a pitch of one slot in a circumferential direction in two rows in an annular shape so as to be separated in a radial direction.

Each of the electrically-insulating layers 7, as shown in FIGS. 4 and 5, is formed into a two-layer construction including: a first electrically-insulating layer 8 formed by applying an epoxy resin functioning as a first electrically-insulating resin so as to cover the joint portions 6 (regions integrated by fusion); and a second electrically-insulating layer 9 formed by applying a silicone resin functioning as a second electrically-insulating resin so as to cover the first electrically-insulating layer 8 and the regions of the end portions 4c from which the electrically-insulating coating has been removed. Each of the first electrically-insulating layers 8 is formed so as to be separated from circumferentially-adjacent joint portions 6 and to bridge radially-adjacent pairs of joint portions 6. Similarly, each of the second electrically-insulating layers 9 is formed so as to be separated from the circumferentially-adjacent joint portions 6 and first electrically-insulating layers 8 and to bridge the radially-adjacent pairs of joint portions 6 and the first electrically-insulating layer 8.

Moreover, when the joint portions 6 are formed by TIG welding, an oxide film is formed on the exposed surfaces of the metal wile material 400, and the electrically-insulating coating 401 in the vicinity of the exposed metal wire material 400 may be damaged or deteriorate. Thus, at least the second electrically-insulating layer 9 is formed so as to extend to a sound portion of the electrically-insulating coating 401 that has not been damaged and has not deteriorated.

In the stator 1 constructed in this manner, because the stator winding 3 is prepared by inserting U-shaped conductor segments 4 functioning as base strands into pairs of slots 2a from a first end surface end of a stator core 2 and joining together end portions of the conductor segments 4 projecting outward from a second end surface end of the stator core 2, the joint portions 6 are arranged into an annular shape in a circumferential direction at the second end surface of the stator core 2, facilitating the application of the epoxy resin and the silicone resin constituting the first and second electrically-insulating layers 8 and 9.

Because the first electrically-insulating layers 8 are formed using an epoxy resin, rigidity of the stator 1 can be increased.

Because the second electrically-insulating layers 9 are formed using a silicone resin, effects are achieved that enable vibration of the second coil end group 3r to be damped.

First electrically-insulating layers 8 composed of an epoxy resin are formed by application so as to cover each of the joint portions 6 and to bridge radially-adjacent pairs of joint portions 6, and second electrically-insulating layers 9 composed of a silicone resin are formed by application so as to cover the first electrically-insulating layers 8 and the regions of the end portions 4c from which the electrically-insulating coating has been removed and to bridge the radially-adjacent pairs of joint portions 6. The epoxy resin has a large modulus of elasticity and coefficient of thermal conductivity compared to the silicone resin.

Now, because first electrically-insulating layers 8 having a large modulus of elasticity are formed so as to bridge radially-adjacent pairs of joint portions 6, the overall rigidity of the stator 1 is increased. Thus, electromagnetic noise resulting from vibration of the stator core 2 brought about by magnetic attraction arising between the stator and the rotor is reduced during operation of a dynamoelectric machine mounted with the stator 1. In addition, because the overall rigidity of the stator 1 is increased, the resonant frequency of the stator core 2 is shifted to higher frequencies, reducing electromagnetic noise in a low-speed range of rotational speeds of the engine.

Because second electrically-insulating layers 9 having a small modulus of elasticity are formed into a bridge shape between radially-adjacent pairs of joint portions 6, vibration of the second coil end group 3r accompanying the vibration of the stator core 2 is damped by the second electrically-insulating layers 9, suppressing the occurrence of electromagnetic noise.

Since the modulus of elasticity of the first electrically-insulating layers 8 is large, cracking and peeling may occur easily in the first electrically-insulating layers 8 as a result of differences in coefficient of thermal expansion between the metal wire material 400 and the first electrically-insulating layers 8. On the other hand, because the second electrically-insulating layers 9 has a small modulus of elasticity, neither cracking nor peeling occurs in the second electrically-insulating layers 9. Thus, even if cracking and peeling does hypothetically occur in the first electrically-insulating layers 8, exposure of the joint portions 6 to the exterior is prevented by the second electrically-insulating layers 9 which are formed so as to cover the first electrically-insulating layers 8. Thus, even if the stator winding 3 is exposed to moisture due to immersion in muddy water, etc., galvanic corrosion of the joint portions 6 is suppressed, improving electrical insulation.

Because the second electrically-insulating layers 9 are formed so as to extend to sound portions of the electrically-insulating coating 401 that have not been damaged and have not deteriorated, exposure of the metal wire material 400 to the exterior is prevented, improving electrical insulation.

Because the electrically-insulating layers 7 are formed into a two-layer construction including the first and second electrically-insulating layers 8 and 9, the second electrically-insulating layers 9, which have poor thermal conductivity, can be formed so as to be thin. Here, the thinner the second electrically-insulating layers 9 can be formed, the greater heat dissipation characteristics through the second electrically-insulating layers 9 can be improved. Thus, during the operation of the stator 1, heat generated in the welded portions where the resistance has been increased by welding is swiftly transferred through the first electrically-insulating layers 8 to the second electrically-insulating layers 9 and dissipated by the second electrically-insulating layers 9. As a result, excessive temperature increases in the stator winding 3 are suppressed, suppressing heat degradation of the portions of the electrically-insulating coating 401 of the conductor segments 4 in the vicinity of the electrically-insulating layer 7, thereby preventing the deterioration of electrical insulation in the stator 1.

Now, the thermal conductivity of the epoxy resin is 0.30 W/mK, and the thermal conductivity of the silicone resin is 0.15 W/mK. Thus, results were obtained showing that temperature increases in the stator winding were reduced by 7 degrees Celsius (7° C.) and the overall value of electromagnetic noise was reduced by 3 dB using the present construction in which the electrically-insulating layer 7 has a two-layer construction including epoxy resin and silicone resin compared to a construction in which an electrically-insulating layer had a single-layer silicone-resin construction in which the total thickness was identical to that of the electrically-insulating layer 7 of the present invention.

Next, the modulus of elasticity of the first electrically-insulating layers 8 and the second electrically-insulating layers 9 was investigated.

First, a large number of stators were prepared by applying an epoxy resin so as to cover each of the joint portions 6, to be separated from circumferentially-adjacent joint portions 6, and to bridge radially-adjacent pairs of joint portions 6. The modulus of elasticity of the epoxy resin applied to the joint portions 6 was varied in each stator. The stators prepared in this manner were mounted to a dynamoelectric machine and peak values of electromagnetic noise up to 3,000 rpm were measured during full load, the results being shown in FIG. 7.

Figure 7:
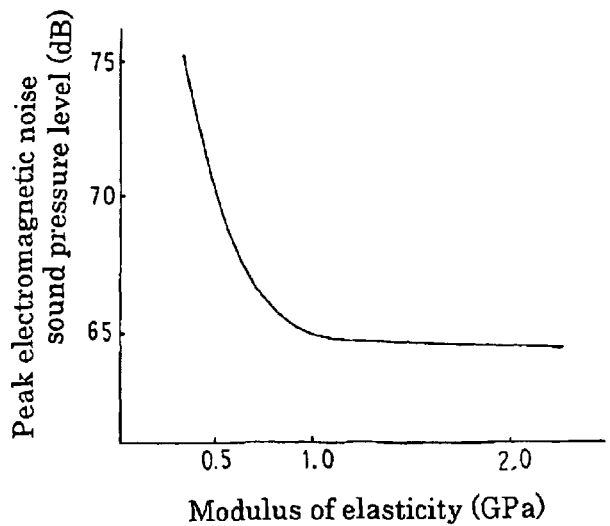
FIG. 7 is a graph showing a relationship between modulus of elasticity of a resin and peak electromagnetic noise in the present invention.

From FIG. 7, it can be seen that the peak value of electromagnetic noise depends on the modulus of elasticity of the resin and is stable at less than or equal to 65 dB when the modulus of elasticity of the resin is greater than or equal to 1.0 GPa. This is because when the modulus of elasticity of the resin is greater than or equal to 1.0 GPa, the rigidity of the resin formed into bridges between radially-adjacent pairs of joint portions 6 is increased, making the overall rigidity of the stator sufficiently large. As a result, it can also be inferred that vibration of the stator core resulting from magnetic attraction occurring between the stator and the rotor is suppressed. Consequently, since 65 dB is an acceptable noise level for electromagnetic noise in product specifications, it is desirable for the modulus of elasticity of the first electrically-insulating layers 8 to be greater than or equal to 1.0 GPa.

The stators prepared in this manner were each subjected to 1,000 hot and cold cycles of 200 degrees Celsius (200° C.) for one hour and −40 degrees Celsius (−40° C.) for one hour, then leakage current was measured. Here, it was deemed that no cracking had occurred if the leakage current was less than or equal to 1 mA.

From this hot and cold cycle test, results were obtained that showed that no observable cracking occurred when the modulus of elasticity of the resin was 0.9 GPa or less, that the rate of occurrence of cracking was 0.05 percent (0.05%) when the modulus of elasticity of the resin was 1.0 GPa, and that the rate of occurrence of cracking increases rapidly to 5.0 percent (5.0%) when the modulus of elasticity of the resin was 5.0 GPa. Consequently, it is desirable for the modulus of elasticity of the second electrically-insulating layers 9 to be less than 1.0 GPa to reliably prevent deterioration of electrical insulation resulting from cracking occurring in the first electrically-insulating layers 8.

Moreover, in Embodiment 1 above, a stator core 2 in which slots 2a are formed at a ratio of one slot per phase per pole is explained as being used, but a stator core in which slots are formed at a ratio of two slots per phase per pole may also be used. In that case, the conductor segments 4 are inserted into pairs of slots six slots apart.

In Embodiment 1 above, pairs of conductor segments 4 are explained as being inserted into pairs of slots three slots apart, but the number of conductor segments 4 inserted into the pairs of slots is not limited to two provided that the straight portions 4a of the conductor segments 4 are inserted into different addresses (layers) inside the two slots 2a constituting each of the pairs of slots and the number of conductor segments 4 may also be one, or three or more. When the number of conductor segments 4 inserted into each of the pairs of slots is one, the joint portions 6 are arranged into an annular shape in one row in a circumferential direction, and the first electrically-insulating layers 8 are formed so as to bridge the circumferentially-adjacent pairs of joint portions 6. When the number of conductor segments 4 inserted into each of the pairs of slots is three, the joint portions 6 are arranged into an annular shape in three rows in a circumferential direction, and the first electrically-insulating layers 8 are formed so as to bridge sets of three radially-adjacent joint portions 6.

Embodiment 2

Figure 8:
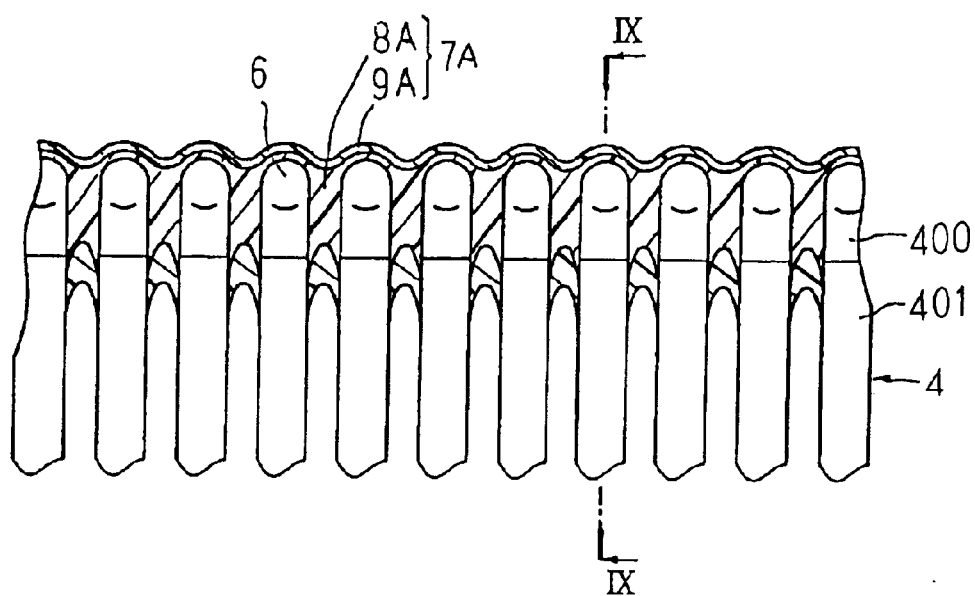
FIG. 8 is a cross section explaining an electrical insulation construction of joint portions of a stator winding in a stator for a dynamoelectric machine according to Embodiment 2 of the present invention.
Figure 9:
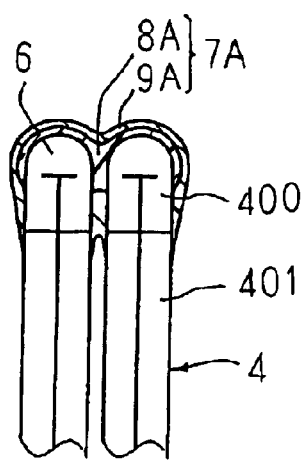
FIG. 9 is a cross section taken along line IX—IX in FIG. 8 viewed from the direction of the arrows.

FIG. 8 is a cross section explaining an electrical insulation construction of joint portions of a stator winding in a stator for a dynamoelectric machine according to Embodiment 2 of the present invention, and FIG. 9 is a cross section taken along line IX—IX in FIG. 8 viewed from the direction of the arrows.

In Embodiment 2, an electrically-insulating layer 7A is formed into a two-layer construction including: a first electrically-insulating layer 8A composed of an epoxy resin; and a second electrically-insulating layer 9A composed of a silicone resin, the first electrically-insulating layer 8A being applied and shaped so as to cover each of the joint portions 6 (regions integrated by fusion) and to bridge radially- and circumferentially-adjacent pairs of joint portions 6, and the second electrically-insulating layer 9A being applied and shaped so as to cover the first electrically-insulating layers 8A and the regions of the end portions 4c from which the electrically-insulating coating has been removed and to bridge the radially and circumferentially-adjacent pairs of joint portions 6 and the first electrically-insulating layers 8A, as shown in FIGS. 8 and 9.

Moreover, the rest of this embodiment is constructed in a similar manner to Embodiment 1 above.

According to Embodiment 2, because a first electrically-insulating layer 8A having a large modulus of elasticity is formed into a bridge shape on radially- and circumferentially-adjacent pairs of joint portions 6, the rigidity of the stator is further increased compared to Embodiment 1 above, further suppressing the occurrence of electromagnetic noise resulting from vibration of the stator core 2.

Because a second electrically-insulating layer 9A having a small modulus of elasticity is formed into a bridge shape on radially- and circumferentially-adjacent pairs of joint portions 6, vibration of the second coil end group 3r accompanying the vibration of the stator core is further damped by the second electrically-insulating layer 9A, further suppressing the occurrence of electromagnetic noise.

Moreover, according to Embodiment 2, a 2-dB electromagnetic noise reduction was obtained compared to Embodiment 1 above.

Embodiment 3

In Embodiments 1 and 2 above, the stator winding 3 is constructed using U-shaped conductor segments 4 as base strands, but in Embodiment 3, a stator winding 16 is constituted using continuous conductor wires 30 as base strands.

Figure 10:
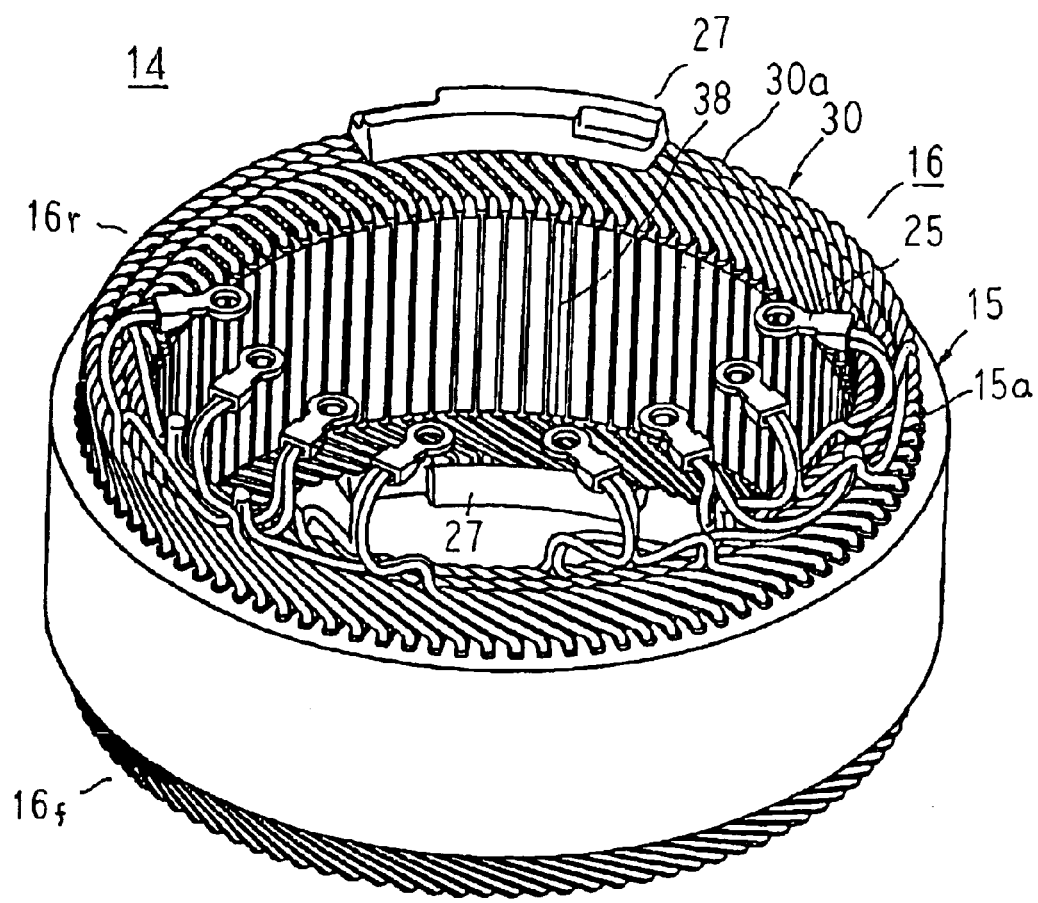
FIG. 10 is a perspective showing a stator for a dynamoelectric machine according to Embodiment 3 of the present invention.
Figure 11:
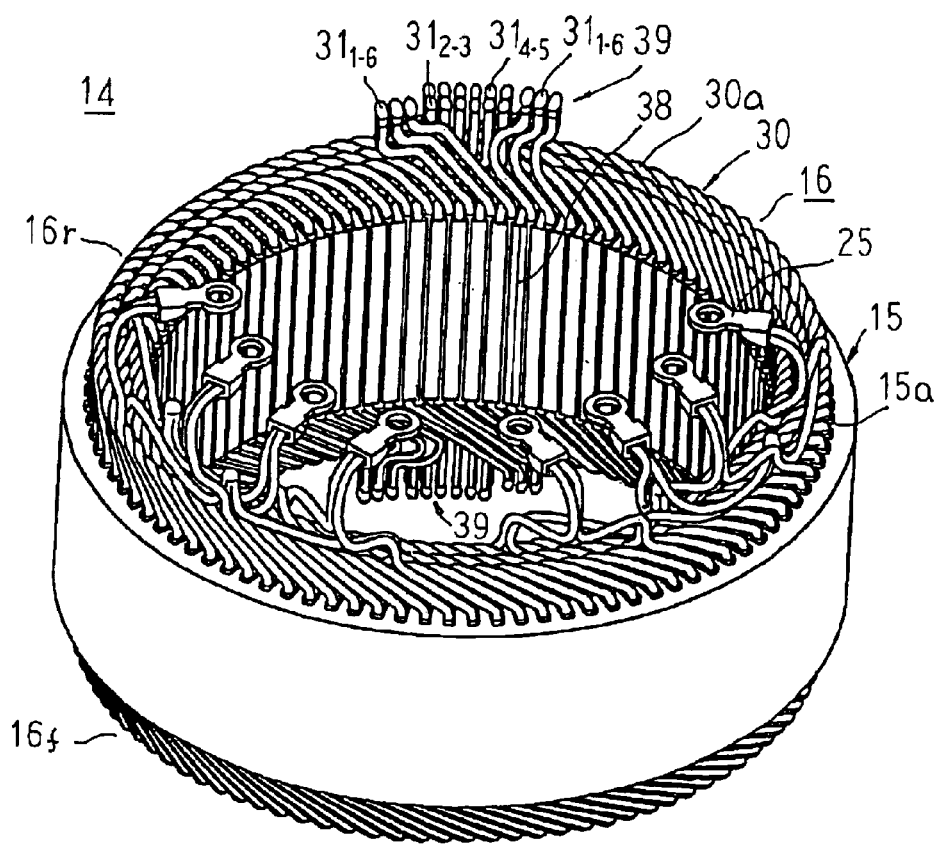
FIG. 11 is a perspective showing the stator for a dynamoelectric machine according to Embodiment 3 of the present invention before mounting caps.
Figure 12:
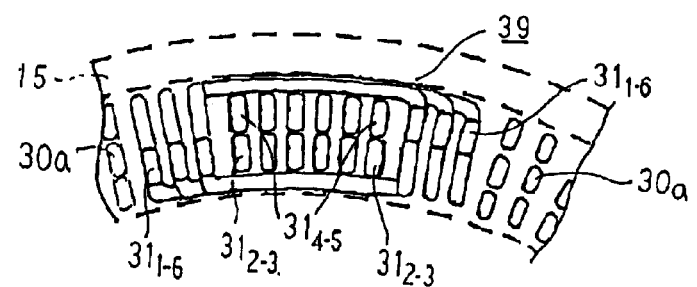
FIG. 12 is an end elevation showing a vicinity of an ancillary connection portion in the stator for a dynamoelectric machine according to Embodiment 3 of the present invention viewed from axially outside before mounting caps.
Figure 13:
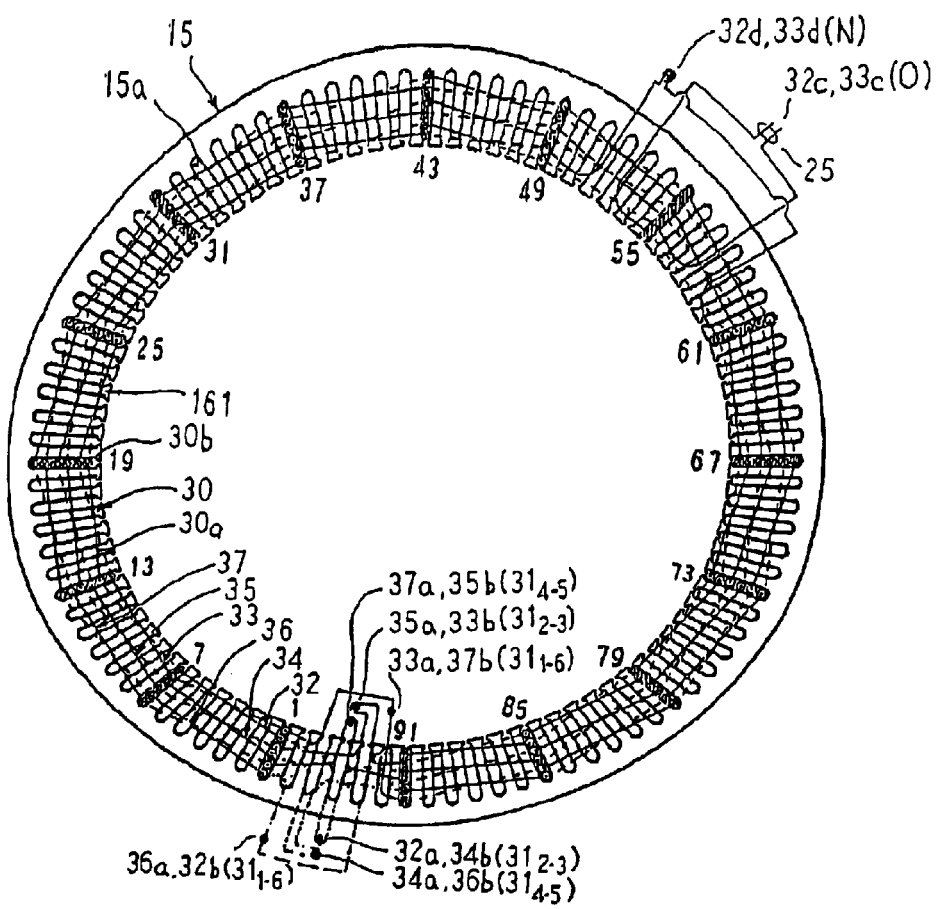
FIG. 13 is an end elevation schematically showing a first single-phase winding phase portion of a stator winding in the stator for a dynamoelectric machine according to Embodiment 3 of the present invention.
Figure 14:
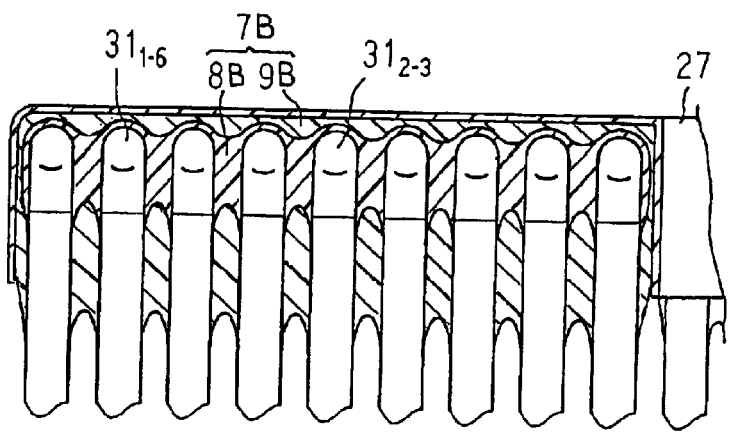
FIG. 14 is a partial cross section showing a vicinity of an ancillary connection portion of the stator for a dynamoelectric machine according to Embodiment 3 of the present invention with a cap mounted.
Figure 15:
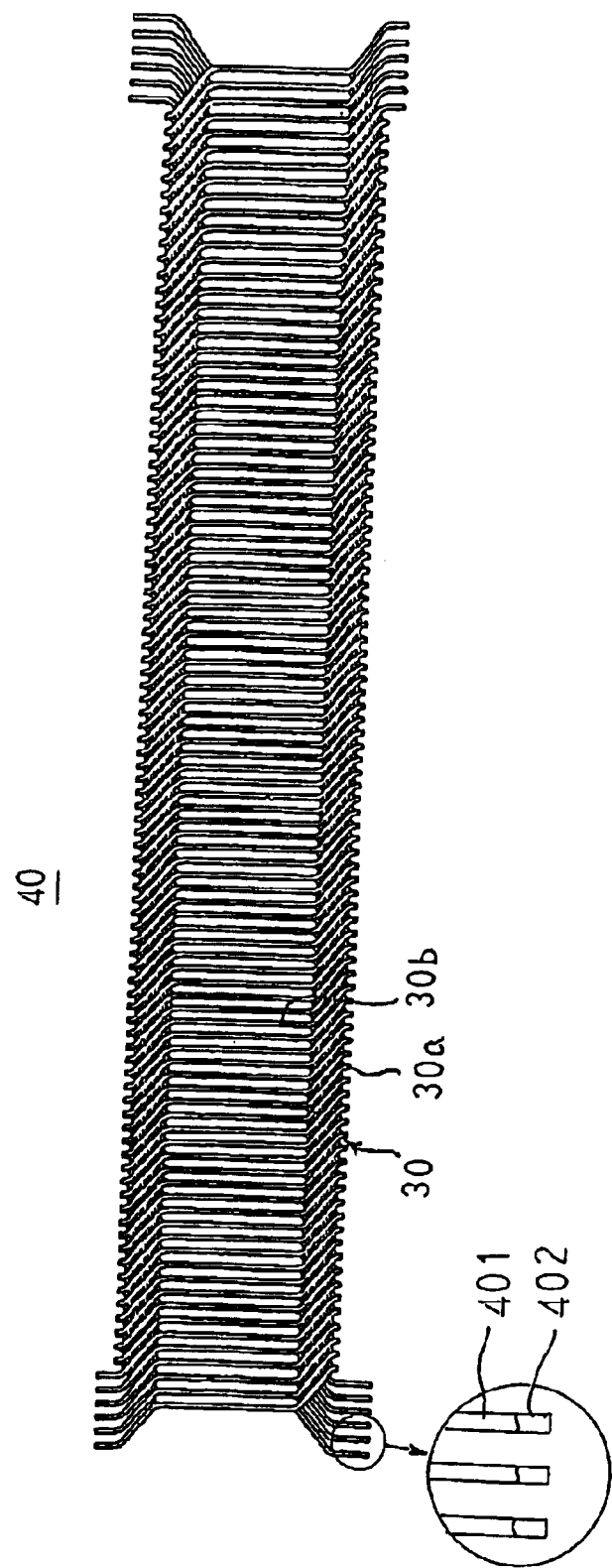
FIG. 15 is a plan showing a winding assembly used in the stator winding in the stator for a dynamoelectric machine according to Embodiment 3 of the present invention.
Figure 16:
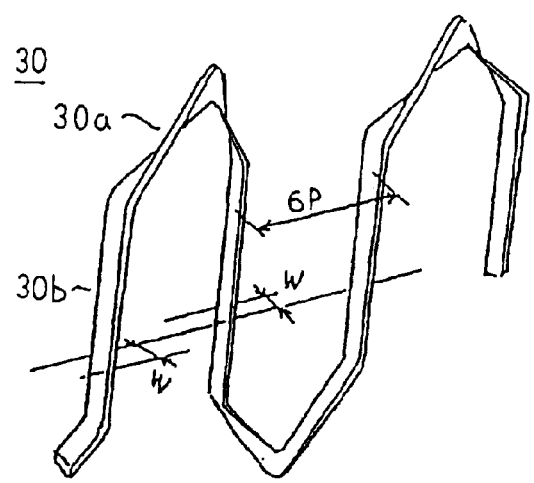
FIG. 16 is a perspective showing a continuous conductor wire constituting part of the winding assembly shown in FIG. 15.
Figure 17:
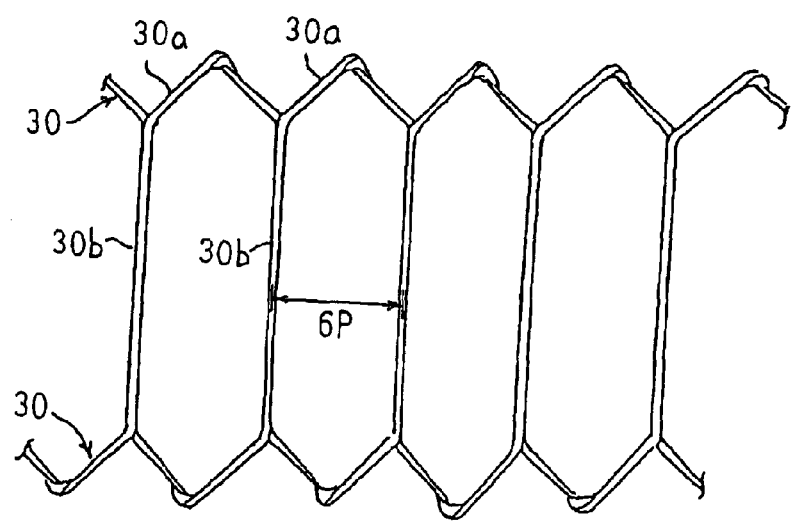
FIG. 17 is a partial perspective showing a pair of continuous conductor wires constituting part of the winding assembly shown in FIG. 15.

FIG. 10 is a perspective showing a stator for a dynamoelectric machine according to Embodiment 3 of the present invention, FIG. 11 is a perspective showing the stator for a dynamoelectric machine according to Embodiment 3 of the present invention before mounting caps, FIG. 12 is an end elevation showing a vicinity of an ancillary connection portion in the stator for a dynamoelectric machine according to Embodiment 3 of the present invention viewed from axially outside before mounting caps, and FIG. 13 is an end elevation schematically showing a first single-phase winding phase portion of a stator winding in the stator for a dynamoelectric machine according to Embodiment 3 of the present invention, broken lines in the figure indicating wiring at a first end surface end, solid lines indicating wiring at a second end surface end, and black circles indicating joint portions. FIG. 14 is a partial cross section showing a vicinity of an ancillary connection portion of the stator for a dynamoelectric machine according to Embodiment 3 of the present invention with a cap mounted, FIG. 15 is a plan showing a winding assembly used in the stator winding in the stator for a dynamoelectric machine according to Embodiment 3 of the present invention, FIG. 16 is a perspective showing a continuous conductor wire constituting part of the winding assembly shown in FIG. 15, and FIG. 17 is a partial perspective showing a pair of continuous conductor wires constituting part of the winding assembly shown in FIG. 15.

In the figures, a stator 14 is constituted by: an annular stator core 15; and a stator winding 16 installed in the stator core 15.

In the stator core 15, slots 15a having grooves lying in an axial direction are arranged at a predetermined pitch in a circumferential direction so as to open onto an inner circumferential side. Here, the slots 15a are formed at a ratio of two slots per phase per pole. In other words, for a rotor in which the number of magnetic poles is sixteen, ninety-six slots 15a are arranged circumferentially on an inner circumferential side of the stator core 15. The stator winding 16 is constructed by installing in the stator core 15 continuous conductor wires 30 functioning as base strands. These continuous conductor wires 30 are formed by coating an electrically-insulating coating 401 (an enamel coating, for example) onto a metal wire material 402 (a copper wire material, for example) having a rectangular cross section. In addition, to facilitate explanation, Slot Numbers from 1 to 96 are allocated to each of the slots 15a as shown in FIG. 13, and the positions in each of the slots 15a in which the conductor segments 30 are housed are designated Address 1, Address 2, etc., through Address 6, respectively, radially outward from a radially-inner side.

First, a specific construction of the stator winding 16 will be explained.

A first single-phase winding phase portion 161, as shown in FIG. 13, is constituted by first to sixth winding sub-portions. 32 to 37 each composed of one continuous conductor wire 30.

The first winding sub-portion 32 is constructed by wave winding one continuous conductor wire 30 into every sixth slot from Slot Numbers 1 to 91 so as to alternately occupy Address 2 and Address 1 in the slots 15a. The second winding sub-portion 33 is constructed by wave winding a continuous conductor wire 30 into every sixth slot from Slot Numbers 1 to 91 so as to alternately occupy Address 1 and Address 2 in the slots 15a. The third winding sub-portion 34 is constructed by wave winding a continuous conductor wire 30 into every sixth slot from Slot Numbers 1 to 91 so as to alternately occupy Address 4 and Address 3 in the slots 15a. The fourth winding sub-portion 35 is constructed by wave winding a continuous conductor wire 30 into every sixth slot from Slot Number 1 to 91 so as to alternately occupy Address 3 and Address 4 in the slots 15a. The fifth winding sub-portion 36 is constructed by wave winding a continuous conductor wire 30 into every sixth slot from Slot Number 1 to 91 so as to alternately occupy Address 6 and Address 5 in the slots 15a. The sixth winding sub-portion 37 is constructed by wave winding a continuous conductor wire 30 into every sixth slot from Slot Number 1 to 91 so as to alternately occupy Address 5 and Address 6 in the slots 15a. In each of the slots 15a, straight portions 30b of the six continuous conductor wires 30 are arranged so as to line up in one column in a radial direction (a slot depth direction) with longitudinal axes of their rectangular cross sections aligned radially.

At a second end surface end (a second axial end) of the stator core 15, a first end portion 33a of the second winding sub-portion 33 projecting outward from Address 1 of Slot Number 1 and a second end portion 37b of the sixth winding sub-portion 37 projecting outward from Address 6 of Slot Number 91 are joined, a first end portion 35a of the fourth winding sub-portion 35 projecting outward from Address 3 of Slot Number 1 and a second end portion 33b of the second winding sub-portion 33 projecting outward from Address 2 of Slot Number 91 are joined, and a first end portion 37a of the sixth winding sub-portion 37 projecting outward from Address 5 of Slot Number 1 and a second end portion 35b of the fourth winding sub-portion 35 projecting outward from Address 4 of Slot Number 91 are joined to form a three-turn wave winding in which the second, fourth, and sixth winding sub-portions 33, 35, and 37 are connected in series. Here, the end portions are stacked in a radial direction, and welded to each other by TIG welding, etc. Moreover, a first near-address joint portion $31_{2-3}$ constituting a joint portion between the first end portion 35a of the fourth winding sub-portion 35 and the second end portion 33b of the second winding sub-portion 33 and a second near-address joint portion $31_{4-5}$ constituting a joint portion between the first end portion 37a of the sixth winding sub-portion 37 and the second end portion 35b of the fourth winding sub-portion 35 are lined up in one column in a radial direction so as to be separated from each other at the same axial height.

Here, a first end portion region of the continuous conductor wire 30 constituting the second winding sub-portion 33 projects outward from Address 1 of slot 15a Number 1, bends and extends for a predetermined distance in a counterclockwise direction in FIG. 13 above a second end surface of the stator core 15, then bends axially outward, next bends radially outward, and finally bends axially outward. A second end portion region of the continuous conductor wire 30 constituting the sixth winding sub-portion 37 projects outward from Address 6 of slot 15a Number 91, bends and extends for a predetermined distance in a clockwise direction in FIG. 13 above the second end surface of the stator core 15, then bends axially outward, next bends radially inward, and finally bends axially outward. The first end portion 33a of the continuous conductor wire 30 constituting the second winding sub-portion 33 and the second end portion 37b of the continuous conductor wire 30 constituting the sixth winding sub-portion 37 are joined. Thus, a distant-address joint portion $31_{1-6}$ constituting a joint portion between the first end portion 33a of the second winding sub-portion 33 and the second end portion 37b of the sixth winding sub-portion 37 is arranged so as to be offset by three slots in a counterclockwise direction in FIG. 13 at the same axial height as the first and second near-address joint portions $31_{2-3}$ and $31_{4-5}$ which line up in a radial direction.

At a first end surface end (a first axial end) of the stator core 15, a first end portion 32a of the first winding sub-portion 32 projecting outward from Address 2 of Slot Number 1 and a second end portion 34b of the third winding sub-portion 34 projecting outward from Address 3 of Slot Number 91 are joined, a first end portion 34a of the third winding sub-portion 34 projecting outward from Address 4 of Slot Number 1 and a second end portion 36b of the fifth winding sub-portion 36 projecting outward from Address 5 of Slot Number 91 are joined, and a first end portion 36a of the fifth winding sub-portion 36 projecting outward from Address 6 of Slot Number 1 and a second end portion 32b of the first winding sub-portion 32 projecting outward from Address 1 of Slot Number 91 are joined to form a three-turn wave winding in which the first, third, and fifth winding sub-portions 32, 34, and 36 are connected in series. Here, the end portions are stacked in a radial direction, and welded to each other by TIG welding, etc. Moreover, a first near-address joint portion $31_{2-3}$ constituting a joint portion between the first end portion 32a of the first winding sub-portion 32 and the second end portion 34b of the third winding sub-portion 34 and a second near-address joint portion $31_{4-5}$ constituting a joint portion between the first end portion 34a of the third winding sub-portion 34 and the second end portion 36b of the fifth winding sub-portion 36 are lined up in one column in a radial direction so as to be separated from each other at the same axial height.

Here, a first end portion region of the continuous conductor wire 30 constituting the fifth winding sub-portion 36 projects outward from Address 6 of slot 15a Number 1, bends and extends for a predetermined distance in a counterclockwise direction in FIG. 13 above a first end surface of the stator core 15, then bends axially outward, next bends radially inward, and finally bends axially outward. A second end portion region of the continuous conductor wire 30 constituting the first winding sub-portion 32 projects outward from Address 1 of slot 15a Number 91, bends and extends for a predetermined distance in a clockwise direction in FIG. 13 above the first end surface of the stator core 15, then bends axially outward, next bends radially outward, and finally bends axially outward. The first end portion 36a of the continuous conductor wire 30 constituting the fifth winding sub-portion 36 and the second end portion 32a of the continuous conductor wire 30 constituting the first winding sub-portion 32 are joined. Thus, the distant-address joint portion $31_{1\text{-}6}$ constituting a joint portion between the first end portion 36a of the fifth winding sub-portion 36 and the second end portion 32b of the first winding sub-portion 32 is arranged so as to be offset by three slots in a clockwise direction in FIG. 13 at the same axial height as the first and second near-address joint portions $31_{2\text{-}3}$ and $31_{4\text{-}5}$ which line up in a radial direction.

A portion of the continuous wire 30 of the first winding sub-portion 32 projecting outward at the second end surface end of the stator core 15 from Slot Numbers 49 and 55 is cut, and a portion of the continuous wire 30 of the second winding sub-portion 33 projecting outward at the second end surface end of the stator core 15 from Slot Numbers 55 and 61 is cut. Then, the three-turn first single-phase winding phase portion 161 is formed such that the first, third, and fifth winding sub-portions 32, 34, and 36 connected in series and the second, fourth, and sixth winding sub-portions 33, 35, and 37 connected in series are connected in parallel by connecting a first cut end 32c of the first winding sub-portion 32 and a first cut end 33c of the second winding sub-portion 33 to metal connection fitting 25 and joining together a second cut end 32d of the first winding sub-portion 32 and a second cut end 33d of the second winding sub-portion 33.

Moreover, the first cut end 32c of the first winding sub-portion 32 and the first cut end 33c of the second winding sub-portion 33 become an output wire (O) of the first single-phase winding phase portion 161, and the second cut end 32d of the first winding sub-portion 32 and the second cut end 33d of the second winding sub-portion 33 become a neutral-point leader wire (N) of the first single-phase winding phase portion 161.

Moreover, only the first single-phase winding phase portion 161, which is installed in a first slot group including Slot Numbers 1, 7, etc., through 91, is shown in FIG. 13, but second to sixth single-phase winding phase portions 161 are similarly installed in a second slot group including Slot Numbers 2, 8, etc., through 92, a third slot group including Slot Numbers 3, 9, etc., through 93, a fourth slot group including Slot Numbers 4, 10, etc., through 94, a fifth slot group including Slot Numbers 5, 11, etc., through 95, and a sixth slot group including Slot Numbers 6, 12, etc., through 96, respectively. The distant-address joint portions $31_{1\text{-}6}$ of the fourth to sixth slot groups are arranged at the second end surface end so as to be offset by three slots in a clockwise direction in FIG. 13 at the same axial height as the first and second adjacent-address joint portions $31_{2\text{-}3}$ and $31_{4\text{-}5}$ which line up in a radial direction, and distant-address joint portions $31_{1\text{-}6}$ are arranged at the first end surface end so as to be offset by three slots in a counterclockwise direction in FIG. 13 at the same axial height as the first and second adjacent-address joint portions $31_{2\text{-}3}$ and $31_{4\text{-}5}$ which line up in a radial direction.

A first three-phase alternating-current winding is prepared by connecting together each of the neutral-point leader wires (N) of the first, third, and fifth single-phase winding phase portions 161 installed in the first slot group, the third slot group, and the fifth slot group, respectively, to form the first, third, and fifth single-phase winding phase portions 161 into a Y connection (an alternating-current connection). Similarly, a second three-phase alternating-current winding is prepared by connecting together each of the neutral-point leader wires (N) of the second, fourth, and sixth single-phase winding phase portions 161 installed in the second slot group, the fourth slot group, and the sixth slot group, respectively, to form the second, fourth, and sixth single-phase winding phase portions 161 into a Y connection (an alternating-current connection). Finally, the stator 14 shown in FIG. 11 is prepared by connecting a metal connection fitting 25 to each of the neutral-point leader wires (N).

At the second end surface end of the stator winding 16, the return portions 30a of the continuous conductor wires 30 projecting outward from the slots 15a and entering slots 15a six slots away are arranged at a pitch of one slot in a circumferential direction so as to be separated from each other and to form three rows in an annular shape, constituting a second coil end group 16r. A second-end ancillary connection portion 39, as shown in FIG. 12, is constructed by arranging six pairs of first and second near-address joint portions $31_{2\text{-}3}$ and $31_{4\text{-}5}$ lined up in single columns radially at a pitch of one slot in a circumferential direction above the return portions 30a of the second coil end group 16r, and arranging groups of three distant-address joint portions $31_{1\text{-}6}$ at a pitch of one slot at first and second circumferential ends of the six pairs of first and second near-address joint portions $31_{2\text{-}3}$ and $31_{4\text{-}5}$.

Similarly, at the first end surface end of the stator winding 16 constructed in this manner, the return portions 30a of the continuous conductor wires 30 projecting outward from the slots 15a and entering slots 15a six slots away are arranged at a pitch of one slot in a circumferential direction so as to form three rows in an annular shape, constituting a first coil end group 16f. A first-end ancillary connection portion 39, as shown in FIG. 3, is constructed by arranging six pairs of first and second near-address joint portions $31_{2\text{-}3}$ and $31_{4\text{-}5}$ lined up in single columns radially at a pitch of one slot in a circumferential direction above the return portions 30a of the first coil end group 16f, and arranging groups of three distant-address joint portions $31_{1\text{-}6}$ at a pitch of one slot at first and second circumferential ends of the six pairs of first and second near-address joint portions $31_{2\text{-}3}$ and $31_{4\text{-}5}$.

First electrically-insulating layers 8B are formed by applying an epoxy resin so as to cover the near-address joint portions $31_{2\text{-}3}$ and $31_{4\text{-}5}$ and the distant-address joint portions $31_{1\text{-}6}$ (the regions integrated by welding) constituting the first-end and second-end ancillary connection portions 39 and to bridge radially- and circumferentially-adjacent pairs of joint portions. Next, caps 27 composed of a glass-reinforced epoxy resin, for example, are fitted over the first-end and second-end ancillary connection portions 39 formed with the first electrically-insulating layers 8B. Then, a silicone resin is injected inside the caps 27 such that second electrically-insulating layers 9B composed of the silicone resin are applied and shaped so as to cover the first electrically-insulating layer 8B and the regions of the end portions of the continuous conductor wires 30 from which the electrically-insulating coating has been removed, as shown in FIG. 14. These second electrically-insulating layers 9B are formed so as to bridge circumferentially- and radially-adjacent pairs of joint portions. Thus, the stator 14 shown in FIG. 10 is obtained.

In the stator 14 constructed in this manner, each of the continuous conductor wires 30 constituting the first to sixth winding sub-portions 32 to 37 is installed in a wave winding so as to project outward from any given slot 15a at an end surface of the stator core 15, fold over, and enter a slot 15a six slots away. Each of the continuous conductor wires 30 is installed in every sixth slot so as to alternately occupy an inner layer and an outer layer in a slot depth direction (a radial direction).

Next, a method for manufacturing the stator 14 will be explained in detail with reference to FIGS. 15 to 17.

A winding assembly 40 is formed by simultaneously folding twelve continuous conductor wires 30 arranged parallel to each other on a plane at a pitch of one slot.

As shown in FIG. 16, each of the continuous conductor wires 30 is shaped by bending into a planar pattern in which straight portions 30b linked by return portions 30a are arranged at a pitch of six slots (6P). Adjacent pairs of the straight portions 30b are offset by the return portions 30a by a width (w) of the continuous conductor wires 30 in a direction perpendicular to the direction of disposal of the straight portions 30b. Moreover, the slot depth direction is perpendicular to the direction of alignment of the straight portions 30b. Pairs of continuous conductor wires 30 are formed such that continuous conductor wires 30 shaped by bending in this manner are arranged so as to be offset by a pitch of six slots with straight portions 30b stacked (as shown in FIG. 17), the winding assembly 40 being constructed such that six of these pairs are arranged so as to be offset by a pitch of one slot from each other.

In this winding assembly 40, as shown in FIG. 15, ninety-six stacked pairs of straight portions 30b are arranged at a pitch of one slot, and six end portions of the continuous conductor wires 30 project outward on first and second sides at first and second ends of the winding assembly 40. The end portions of the continuous conductor wires 30 projecting outward on the first and second sides at the first and second ends of the winding assembly 40 correspond to the end portions 32a to 37a and 32b to 37b of the first to sixth winding sub-portions 32 to 37 in FIG. 13, the electrically-insulating coating 401 thereof being removed to expose the metal wire material 402.

Although not shown, a rectangular parallelepiped laminated core is prepared by laminating a large number of strip-shaped bodies each composed of a magnetic steel sheet in which slots are formed at a predetermined pitch and integrating the strip-shaped bodies by laser welding, for example. Next, three winding assemblies 40 are mounted to the rectangular parallelepiped laminated core so as to be stacked in a slot depth direction. Here, six straight portions 30b are housed in each of the slots of the laminated core so as to line up in single columns with the longitudinal axes of the rectangular cross sections thereof aligned in the slot depth direction. Then, an annular stator core 15 is prepared by rolling up the laminated core, abutting the end portions of the laminated core, and joining them integrally by laser welding, for example.

Thereafter, the connection process shown in FIG. 13 is applied to the end portions of the continuous conductor wires 30. Then, the first electrically-insulating layers 8B are formed by application on each of the ancillary connection portions 39. Next, the stator 14 shown in FIG. 10 is prepared by fitting the caps 27 onto each of the ancillary connection portions 39 and injecting the silicone resin inside the caps 27 to form the second electrically-insulating layers 9B. Moreover, the ancillary connection portions 39 are formed in a vicinity of abutted portions 38 between the end portions of the rolled-up laminated core.

According to Embodiment 3, because electrically-insulating layers 7B having a two-layer construction composed of a first electrically-insulating layer 8B and a second electrically-insulating layer 9B are formed by application on the joint portions between the end portions of the first to sixth winding sub-portions 32 to 37, similar effects to those in Embodiment 2 above can also be achieved.

According to Embodiment 3, because the stator winding 16 is constituted using continuous conductor wires 30, the number of joints is significantly reduced compared to a stator winding 3 prepared using U-shaped conductor segments 4, improving joining workability and reducing the amount of resin required to form the electrically-insulating layers 7B.

Because the caps 27 are placed on the ancillary connection portions 39, the operation of applying the silicone resin is facilitated, particularly if the silicone resin has a low viscosity. In addition, because protrusion of the electrically-insulating layers 7B is prevented by the caps 27, contact between the electrically-insulating layers 7B and brackets, contact between the electrically-insulating layers 7B and internal components of the dynamoelectric machine, etc., are suppressed when the stator 14 is mounted to a dynamoelectric machine.

Moreover, in Embodiment 3 above, the stator winding 16 is explained as being constructed by connecting the first to sixth winding sub-portions 32 to 37 based on the connection method shown in FIG. 13, but connection of the first to sixth winding sub-portions 32 to 37 is not limited to this method and may be arbitrarily set according to design specifications.

The arrangement of the joint portions in the ancillary connection portions 39 and the arrangement of the ancillary connection portions 39 and the output wires (including the neutral-point leader wires) are not limited to the arrangements in Embodiment 3 above.

In Embodiment 3 above, the winding assemblies 40 are explained as being mounted to the stator core 15 so as to be stacked in three layers in a radial direction, but the winding assemblies 40 may also be mounted to the stator core 15 so as to be stacked in two layers or four or more layers in a radial direction, or a single winding assembly 40 may also be mounted to the stator core 15.

In Embodiment 3 above, the caps 27 are made of a glass-reinforced epoxy resin, but the material of the caps 27 is not limited to the glass-reinforced epoxy resin provided that it has electrically-insulating properties and heat tolerance, and a nylon, for example, is also acceptable.

Moreover, in each of the above embodiments, the first electrically-insulating layers 8, 8A, and 8B are formed so as to cover the joint portions, but the first electrically-insulating layers 8, 8A, and 8B may also be formed so as to cover the joint portions and to extend to the sound portion of the electrically-insulating coating 401. In that case, the second electrically-insulating layers 9A are formed so as to extend to the sound portion of the electrically-insulating coating 401 without exposing the first electrically-insulating layers 8, 8A, and 8B. Thus, electrically-insulating properties and vibration damping effects are increased.

In Embodiment 1 above, an epoxy resin is used for the first electrically-insulating layers 8, but it is only necessary for the first electrically-insulating layer 8 to have a modulus of elasticity that is greater than or equal to 1.0 GPa, for example, and an acrylic resin, for example, may also be used. Furthermore, a silicone resin is used for the second electrically-insulating layers 9, but it is only necessary for the second electrically-insulating layers 9 to have a modulus of elasticity that is less than 1.0 GPa, for example, and a urethane resin, for example, may also be used.

What is claimed is:

1. A stator for a dynamoelectric machine comprising:

an annular stator core in which a large number of slots having grooves lying in an axial direction are formed in a circumferential direction so as to open onto an inner circumferential side; and a stator winding installed in said stator core, said stator winding being provided with a plurality of winding sub-portions constructed by installing base strands in said slots at intervals of a predetermined number of slots so as to alternately occupy an inner layer and an outer layer in a slot depth direction and welding end portions of said base strands, said base strands being formed by coating an electrically-insulating coating onto a metal wire material, and joint portions between said end portions of said base strands being arranged into at least one row in a circumferential direction, wherein a first electrically-insulating layer is formed so as to cover each of said joint portions and to bridge a pair of said joint portions that is adjacent in at least one direction selected from a group including a radial direction and a circumferential direction, a second electrically-insulating layer is formed so as to cover said first electrically-insulating layer and to extend to said electrically-insulating coating of said end portions of said base strands, and said first electrically-insulating layer has a modulus of elasticity that is larger than a modulus of elasticity of said second electrically-insulating layer.

2. The stator for a dynamoelectric machine according to claim 1, wherein said second electrically-insulating layer is formed so as to bridge a pair of said joint portions that is adjacent in at least one direction selected from a group including a radial direction and a circumferential direction.

3. The stator for a dynamoelectric machine according to claim 1, wherein said first electrically-insulating layer is formed so as to cover said joint portions and to extend to said electrically-insulating coating of said end portions of said base strands.

4. The stator for a dynamoelectric machine according to claim 3, wherein said second electrically-insulating layer is formed so as to bridge a pair of said joint portions that is adjacent in at least one direction selected from a group including a radial direction and a circumferential direction.

5. The stator for a dynamoelectric machine according to claim 1, wherein said first electrically-insulating layer is made of an epoxy resin.

6. The stator for a dynamoelectric machine according to claim 1, wherein said second electrically-insulating layer is made of a silicone resin.

7. The stator for a dynamoelectric machine according to claim 1, wherein said base strands are U-shaped conductor segments, said plurality of winding sub-portions are constructed by inserting at least one of said conductor segments into each of pairs of slots from a first axial end of said stator core and welding together end portions of said conductor segments projecting outward at a second axial end of said stator core, said slots in each of said pairs of slots being separated by said predetermined number of slots, and joint portions between said end portions of said conductor segments are arranged into an annular shape in a circumferential direction at said second axial end of said stator core.

8. The stator for a dynamoelectric machine according to claim 1, wherein said base strands are continuous conductor wires, said plurality of winding sub-portions are constituted by at least one winding assembly prepared by bending and shaping a predetermined number of strands of said continuous conductor wires, said winding assembly is constructed by arranging continuous conductor wire pairs equal in number to said predetermined number of slots so as to be offset by a pitch of one slot from each other, said continuous conductor wires being formed into a pattern in which straight portions are linked by return portions and arranged at said predetermined slot pitch and adjacent pairs of said straight portions are offset so as to alternately occupy an inner layer and an outer layer in a slot depth direction by said return portions, said continuous conductor wire pairs each being formed such that two of said continuous conductor wires are arranged so as to be offset by said predetermined slot pitch from each other with said straight portions superposed, and end portions of said continuous conductor wires projecting outward on first and second sides at first and second ends of said winding assembly, and said plurality of winding sub-portions are constructed by welding together said end portions of said continuous conductor wires constituting said winding assembly installed in said stator core projecting outward from said slots at first and second axial ends of said stator core.

9. The stator for a dynamoelectric machine according to claim 8, wherein a cap is mounted so as to cover said second electrically-insulating layer formed on said joint portions between said end portions of said continuous conductor wires.

10. The stator for a dynamoelectric machine according to claim 1, wherein the modulus of elasticity of said first electrically-insulating layer is greater than or equal to 1.0 GPa.

11. The stator for a dynamoelectric machine according to claim 1, wherein the modulus of elasticity of said second electrically-insulating layer is less than 1.0 GPa.

* * * * *